United States Patent
Yamoto

(10) Patent No.: US 11,639,132 B2
(45) Date of Patent: May 2, 2023

(54) TRAFFIC SYSTEM

(71) Applicant: Honda Motor Co., Ltd., Tokyo (JP)

(72) Inventor: Kazuki Yamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/676,754

(22) Filed: Feb. 21, 2022

(65) Prior Publication Data

US 2022/0314877 A1    Oct. 6, 2022

(30) Foreign Application Priority Data

Mar. 31, 2021 (JP) .............................. JP2021-059593

(51) Int. Cl.
*B60Q 5/00* (2006.01)
*G08G 1/16* (2006.01)

(52) U.S. Cl.
CPC ............. *B60Q 5/006* (2013.01); *G08G 1/162* (2013.01); *G08G 1/166* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 5,347,261 A | * | 9/1994 | Adell | B60Q 1/50 340/471 |
| 9,475,461 B1 | * | 10/2016 | Pudiyathanda | G08G 1/09675 |
| 10,049,576 B2 | * | 8/2018 | Nakatani | G01S 15/87 |
| 10,259,383 B1 | * | 4/2019 | Campbell | G06V 20/56 |
| 10,373,499 B1 | * | 8/2019 | Kumar | H04W 4/38 |
| 11,458,891 B1 | * | 10/2022 | Kuehner | H04R 1/323 |
| 2017/0140651 A1 | * | 5/2017 | Lee | B60Q 1/34 |
| 2018/0096601 A1 | * | 4/2018 | Chow | H04W 84/00 |
| 2018/0108253 A1 | * | 4/2018 | Kim | G08G 1/0965 |
| 2018/0134286 A1 | * | 5/2018 | Yi | B60W 60/00272 |
| 2018/0319325 A1 | * | 11/2018 | Tatara | B60Q 1/442 |
| 2018/0361925 A1 | * | 12/2018 | Rowell | B60Q 1/525 |
| 2019/0011930 A1 | * | 1/2019 | Tatara | B60Q 1/508 |
| 2019/0286137 A1 | * | 9/2019 | Matsunaga | G05D 1/0088 |
| 2022/0105866 A1 | * | 4/2022 | Austin | B60W 40/105 |

FOREIGN PATENT DOCUMENTS

JP       2001023098 A       1/2001

* cited by examiner

*Primary Examiner* — Muhammad Adnan
(74) *Attorney, Agent, or Firm* — Duft & Bornsen, PC

(57) ABSTRACT

A traffic system including a first vehicle and a second vehicle. The first vehicle includes a communication unit, a detection device detecting an external situation around the first vehicle, and a microprocessor configured to perform recognizing a moving object based on the external situation detected, determining whether there is an approach risk indicating that a distance from the second vehicle to the moving object becomes equal to or shorter than a predetermined value, and outputting an approach signal when it is determined that there is the approach risk. The second vehicle includes a communication unit, a warning unit issuing an alarm outside of the second vehicle, and a microprocessor configured to perform controlling the warning unit so as to issue the alarm when the approach signal output from the first vehicle is received through the communication unit.

16 Claims, 7 Drawing Sheets

TRAFFIC SYSTEM

CROSS-REFERENCE TO RELATED APPLICATION

This application is based upon and claims the benefit of priority from Japanese Patent Application No. 2021-059593 filed on Mar. 31, 2021, the content of which is incorporated herein by reference.

BACKGROUND OF THE INVENTION

Field of the Invention

This invention relates to a traffic system configured to issue an alarm to a moving object.

Description of the Related Art

Conventionally, as this type of device, there has been known a system that receives information of a vehicle when the vehicle enters a narrow-band communication area and notifies an existing vehicle that the vehicle is approaching from behind. Such a system is disclosed, for example, in Japanese Unexamined Patent Publication No. 2001-023098 (JP2001-023098A).

The system described in JP2001-023098A notifies a vehicle having a communication function of the approaching state of the vehicle. However, it is difficult to notify a moving object such as a vehicle having no communication function of the approaching state.

SUMMARY OF THE INVENTION

An aspect of the present invention is a traffic system including a first vehicle and a second vehicle. The first vehicle includes a communication unit, a detection device that detects an external situation around the first vehicle, and an electronic control unit including a microprocessor and a memory connected to the microprocessor. The microprocessor of the first vehicle is configured to perform recognizing a moving object based on the external situation detected by the detection device, determining whether there is an approach risk indicating that a distance from the second vehicle to the moving object becomes equal to or shorter than a predetermined value, and outputting an approach signal when it is determined that there is the approach risk. The second vehicle includes a communication unit, a warning unit that issues an alarm outside of the second vehicle, and an electronic control unit including a microprocessor and a memory connected to the microprocessor. The microprocessor of the second vehicle is configured to perform controlling the warning unit so as to issue the alarm when the approach signal output from the first vehicle is received through the communication unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 8. A traffic system according to the embodiment of the present invention includes a first vehicle and a second vehicle capable of communicating with each other, and is configured such that the second vehicle issues an alarm on the basis of detection information of a moving object detected by the first vehicle.

Figure 1:
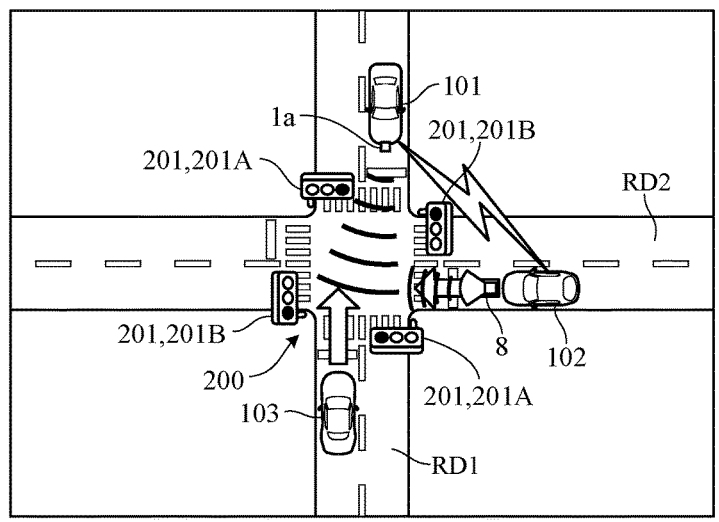
FIG. 1 is a diagram illustrating an example of a travel scene assumed by a traffic system according to an embodiment of the present invention.

FIG. 1 is a diagram illustrating an example of a travel scene assumed by the traffic system according to the present embodiment. FIG. 1 illustrates an intersection 200 where a first road RD1 and a second road RD2 are orthogonal to each other. At the intersection 200, a first traffic light 201A for arranging traffic of vehicles traveling on the first road RD1 is installed facing the first road RD1, and a second traffic light 201B for arranging traffic of vehicles traveling on the second road RD2 is installed facing the second road RD2.

The first traffic light 201A and the second traffic light 201B are configured to sequentially switch between red light indicating a stop instruction, blue light indicating that traveling is possible, and yellow light indicating that traveling is possible but safe stop is difficult at a predetermined cycle. That is, when the first traffic light 201A is blue and yellow, the second traffic light 201B is red, and when the first traffic light 201A changes to red, the second traffic light 201B changes to blue. In FIG. 1, the first traffic light 201A is red, and the second traffic light 201B is blue.

The first vehicle 101 and second vehicle 102 communicable with each other are positioned in front of the intersection 200 on the first road RD1 and in front of the intersection 200 on the second road RD2, respectively. Since the first traffic light 201A is red, the first vehicle 101 is stopped in front of the intersection 200, or is starting to stop in front of the intersection 200. On the other hand, since the second traffic light 201B is blue, the second vehicle 102 passes through the intersection 200 without stopping.

In such a situation, another vehicle 103 (referred to as a target vehicle) traveling on the first road RD1 while facing the first vehicle 101 may erroneously enter the intersection 200 even though the first traffic light 201A is red. For example, the target vehicle 103 may be a manual driving vehicle, and may be driven by the driver without noticing that the first traffic light 201A is red. In this case, the second vehicle 102 and the target vehicle 103 may suddenly approach each other. In particular, if the target vehicle 103 is located in a blind spot from the second vehicle 102, the second vehicle 102 cannot recognize the target vehicle 103, and there is a high possibility that these vehicles suddenly approach each other. In such a case, in order to avoid a sudden approach (referred to as approach risk) between the second vehicle 102 and the target vehicle 103, the present embodiment configures the traffic system as described below.

The first vehicle 101 and the second vehicle 102 are, for example, self-driving vehicles. The first vehicle 101 and the second vehicle 102 may be manual driving vehicles. Hereinafter, for the sake of convenience, the configuration of the traffic system will be described on the assumption that the first vehicle 101 and the second vehicle 102 are self-driving vehicles having functionally the same configuration.

Figure 2:
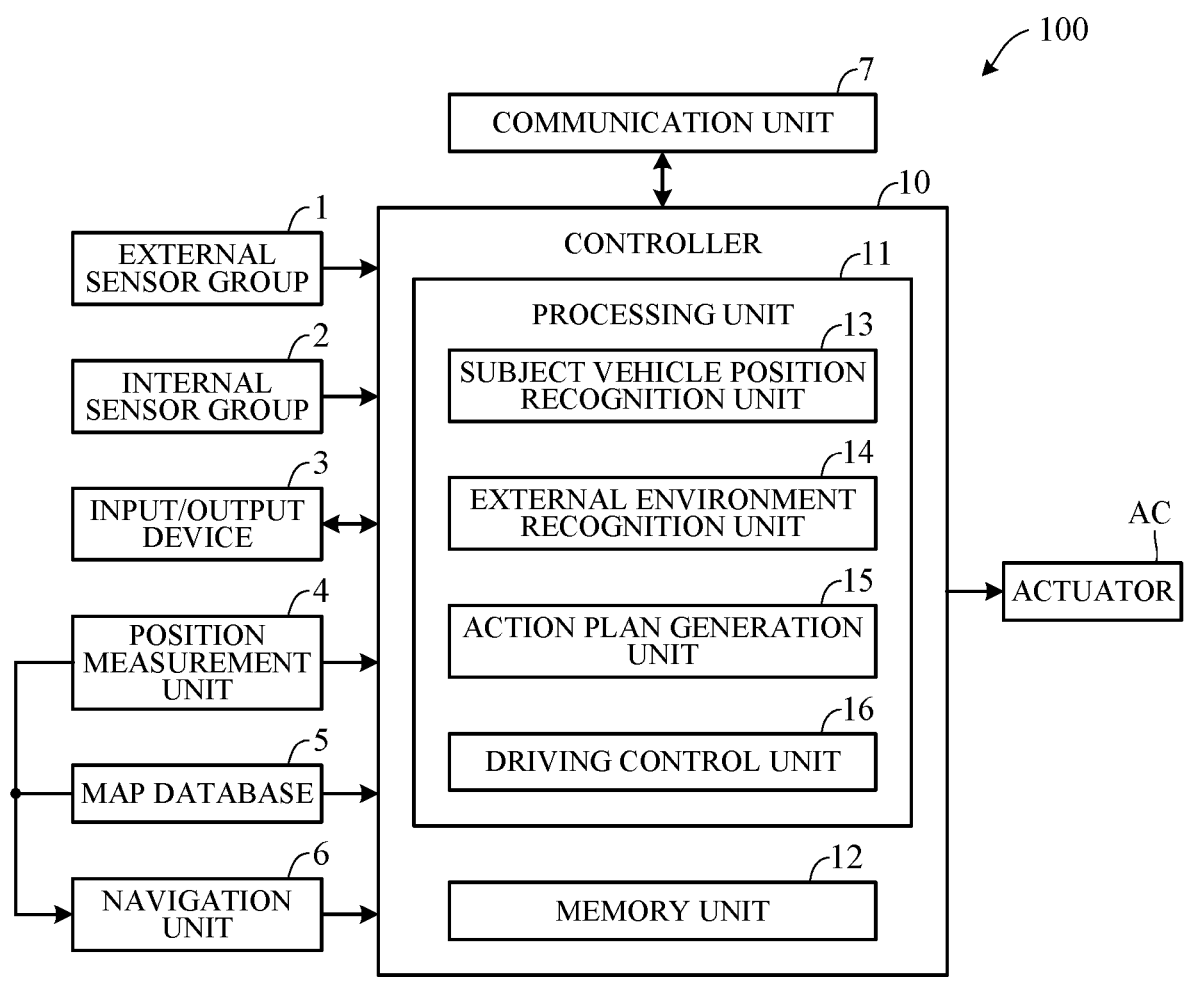
FIG. 2 is a block diagram schematically illustrating an overall configuration of a vehicle control system of a self-driving vehicle to which the traffic system according to the embodiment of the present invention is applied.

First, the general configuration of the subject vehicle for self-driving will be explained. FIG. 2 is a block diagram schematically illustrating an overall configuration of a vehicle control system 100 of a self-driving vehicle (a first vehicle 101 and second vehicle 102) to which a traffic system according to an embodiment of the present invention is applied. As shown in FIG. 2, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10. The self-driving vehicle can travel not only in a self-drive mode but also in a manual drive mode.

The term external sensor group 1 herein is a collective designation encompassing multiple sensors (external sensors) for detecting external circumstances constituting subject vehicle ambience data. For example, the external sensor group 1 includes, inter alia, a LiDAR (Light Detection and Ranging) for measuring distance from the subject vehicle to ambient obstacles by measuring scattered light produced by laser light radiated from the subject vehicle in every direction, a radar (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information of other vehicle, traffic data and the like, periodically or at arbitrary times. In addition to acquiring travel history information of the other vehicle, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. The communication with the other vehicle via the communication unit 7, that is, an inter-vehicle communication is also possible, and thus the system can acquire information which the other vehicle has and transmit information to the other vehicle.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 2, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). The road map information includes information on road position, information on road shape (curvature, etc.), information on gradient of the road, information on position of intersections and branches, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information acquired from the outside of the subject vehicle through the communication unit 7, and map information created by the subject vehicle itself using the detection values of the external sensor group 1 or the detection values of the external sensor group 1 and the internal sensor group 2.

As functional configurations in relation to mainly self-driving, the processing unit 11 includes a subject vehicle position recognition unit 13, an external environment recognition unit 14, an action plan generation unit 15, and a driving control unit 16.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized by communicating with such sensors through the communication unit 7.

The external environment recognition unit 14 recognizes external circumstances around the subject vehicle based on signals from cameras, LiDERs, radars and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

Figure 3:
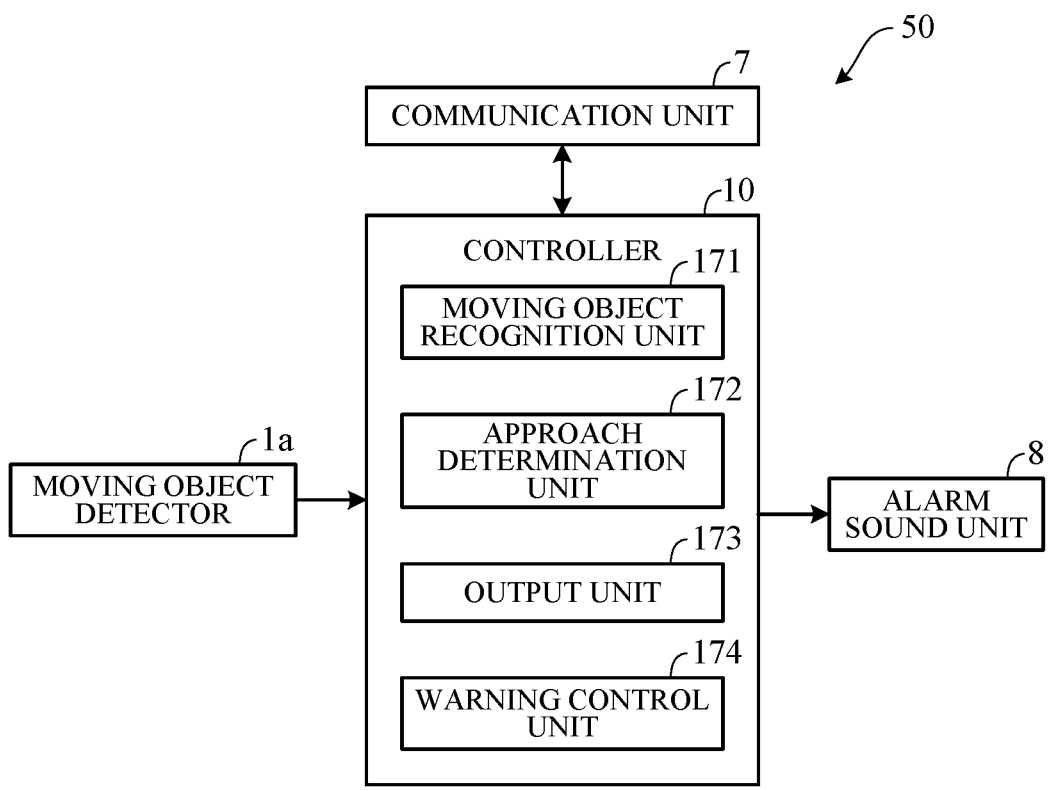
FIG. 3 is a block diagram illustrating a configuration of a vehicle-mounted device provided at each of a first vehicle and second vehicle included in the traffic system according to the embodiment of the present invention.

The traffic system according to the present embodiment includes a vehicle-mounted device that is a part of the vehicle control system 100. Configurations of the vehicle-mounted devices of the first vehicle 101 and second vehicle 102 are identical to each other. FIG. 3 is a block diagram illustrating a configuration of a vehicle-mounted device 50 provided in each of the first vehicle 101 and the second vehicle 102.

As illustrated in FIG. 3, the vehicle-mounted device 50 includes a controller 10, a moving object detector 1a, a communication unit 7, and an alarm sound unit 8.

The moving object detector 1a is a detector that detects moving objects around the subject vehicle, and is configured by using, for example, any one of a radar, a LiDAR, and a camera, or a plurality of these devices in combination. The moving object detector 1a is included in the external sensor group 1 of FIG. 1. The moving objects detected by the moving object detector 1a include the target vehicle 103 illustrated in FIG. 1, bicycles, pedestrians, and others.

The communication unit 7 is configured to enable inter-vehicle communication between the subject vehicle and another vehicle located within a predetermined distance from each other. This allows inter-vehicle communication between the first vehicle 101 and the second vehicle 102 illustrated in FIG. 1. The target vehicle 103 includes neither the moving object detector 1a nor the communication unit 7 capable of inter-vehicle communication. The alarm sound unit (horn) 8 is configured to issue a warning sound to the outside of the subject vehicle in order to call attention to the surroundings.

The controller 10 includes a moving object recognition unit 171, an approach determination unit 172, an output unit 173, and a warning control unit 174 as functional components implemented by the processing unit 11 (FIG. 2). The moving object recognition unit 171, the approach determination unit 172, and the output unit 173 are configured by, for example, the external environment recognition unit 14 illustrated in FIG. 2, and the warning control unit 174 is configured by, for example, the driving control unit 16.

In the present embodiment, as illustrated in FIG. 1, the first vehicle 101 detects the target vehicle 103, and the second vehicle 102 outputs an alarm. In such a situation, the first vehicle 101 may be referred to as a detection vehicle, and the second vehicle 102 may be referred to as a notification vehicle. That is, the first vehicle 101 that is stopped at the intersection 200 is referred to as a detection vehicle, and the second vehicle 102 that is traveling is referred to as a notification vehicle. The moving object recognition unit 171, the approach determination unit 172, and the output unit 173 are functions performed by the detection vehicle (first vehicle 101), and the warning control unit 174 is a function performed by the notification vehicle (second vehicle 102).

The moving object recognition unit 171 recognizes moving objects around the subject vehicle on the basis of a signal from the moving object detector 1a. For example, the moving object recognition unit 171 of the first vehicle 101 recognizes the target vehicle 103 based on a signal from the moving object detector 1a.

The approach determination unit 172 determines whether there is an approach risk between the moving object (target vehicle 103) recognized by the moving object recognition unit 171 and another traveling vehicle (second vehicle 102), that is, whether there is a possibility that the distance from the other traveling vehicle to the moving object will be within a predetermined distance. The predetermined distance is, for example, 0 (first reference value). In this case, the approach determination unit 172 determines whether there is a possibility of collision between the other vehicle and the moving object. The predetermined distance may have a value larger than 0, for example, a value at which sudden braking or sudden steering of the other vehicle is required in order to avoid a collision (second reference value). The predetermined distance may have a value at which no sudden braking or sudden steering is required but the other vehicle and the moving object approach each other to a predetermined extent. For example, the predetermined distance may have a value at which the driver of the moving object can recognize the warning sound emitted from the alarm sound unit of the other vehicle (third reference value). In the following description, for the sake of convenience, it is assumed that the predetermined distance is set to the first reference value or the second reference value.

In determining whether there is an approach risk, the approach determination unit 172 of the first vehicle 101 first recognizes the relative position of the second vehicle 102 to the first vehicle 101 based on a signal from the moving object detector 1a or by inter-vehicle communication, and recognizes the target vehicle 103 approaching the second vehicle 102 based on a signal from the moving object detector 1a. Specifically, from the current position and vehicle speed of the second vehicle 102 acquired by the inter-vehicle communication, the approach determination unit 172 calculates the time from when the second vehicle 102 enters the intersection 200 to the second vehicle 102 passes the intersection 200, and calculates the vehicle speed of the target vehicle 103 based on the signal from the moving object detector 1a. The approach determination unit 172 determines that there is an approach risk when the target vehicle 103 is predicted to enter the intersection 200 within the time from when the second vehicle 102 enters the intersection 200 to when the second vehicle passes the intersection 200.

Not only the first vehicle 101 but also the second vehicle 102 has the moving object detector 1a. Therefore, when the second vehicle 102 itself can recognize the moving object (target vehicle 103), the first vehicle 101 does not need to recognize the target vehicle 103. Therefore, the approach determination unit 172 of the first vehicle 101 may determine whether the target vehicle 103 is located in an area that is a blind spot for the second vehicle 102 on the basis of a signal from the moving object detector 1a, and determine the presence or absence of an approach risk for the target vehicle 103 located in the area that is a blind spot from the second vehicle 102. For example, when the target vehicle 103 cannot be detected by the moving object detector 1a of the second vehicle 102 because there is a building at the corner of the intersection 200, the approach determination unit 172 of the first vehicle 101 may determine the presence or absence of an approach risk. This eliminates the need to determine the presence or absence of contact with all the moving objects recognized by the moving object recognition unit 171, thereby reducing the processing load of the controller 10.

The approach determination unit 172 may determine whether the target vehicle 103 is approaching the traveling second vehicle 102. In addition, when determining that the target vehicle is approaching, the approach determination unit 172 may further determine whether the target vehicle 103 is obliged to stop. For example, as illustrated in FIG. 1, the approach determination unit 172 may determine whether the first traffic light 201A installed facing the first road RD1 on which the target vehicle 103 is traveling is red from an image or the like of the vehicle-mounted camera of the first vehicle 101. When determining that the first traffic light 201A is red and the target vehicle 103 is obliged to stop but does not fulfill the obligation to stop, the approach determination unit 172 may determine that there is an approach risk. In this case, when recognizing on the basis of a signal from the moving object detector 1a that the target vehicle 103 has approached the intersection 200 where the traffic light is red but does not decelerate or decelerates insufficiently, the approach determination unit 172 may determine that the target vehicle 103 may enter the intersection 200 ignoring the traffic light and that there is an approach risk.

In other words, the approach determination unit 172 may determine whether the target vehicle 103 is approaching the traveling second vehicle 102, and when determining that the target vehicle 103 is approaching, then determines whether the second vehicle 102 is obliged to stop, that is, whether the second traffic light 201B is blue. When the second vehicle 102 is not obliged to stop (when the second traffic light 201B is blue), the approach determination unit 172 may determine that there is an approach risk between the second vehicle 102 and the target vehicle 103.

When the approach determination unit 172 determines that there is an approach risk between the second vehicle 102 and the target vehicle 103, the output unit 173 outputs an approach signal at a predetermined timing. For example, the output unit 173 grasps the position of the second vehicle 102 via the communication unit 7, and outputs an approach signal when the distance from the intersection 200 to the second vehicle 102 is within a predetermined distance. The approach signal output from the output unit 173 is transmitted to the controller 10 of the second vehicle 102 via the communication unit 7.

Upon receipt of the approach signal from the first vehicle 101, the warning control unit 174 of the second vehicle 102 controls the alarm sound unit 8 to output a warning immediately after the reception. Accordingly, a warning can be issued to the driver of the target vehicle 103 approaching the intersection 200. As a result, the driver notices that the first traffic light 201A is red, decelerates and stops in front of the intersection 200, so that it is possible to avoid contact between the second vehicle 102 and the target vehicle 103, sudden braking of the second vehicle 102, and the like.

Figure 4A:
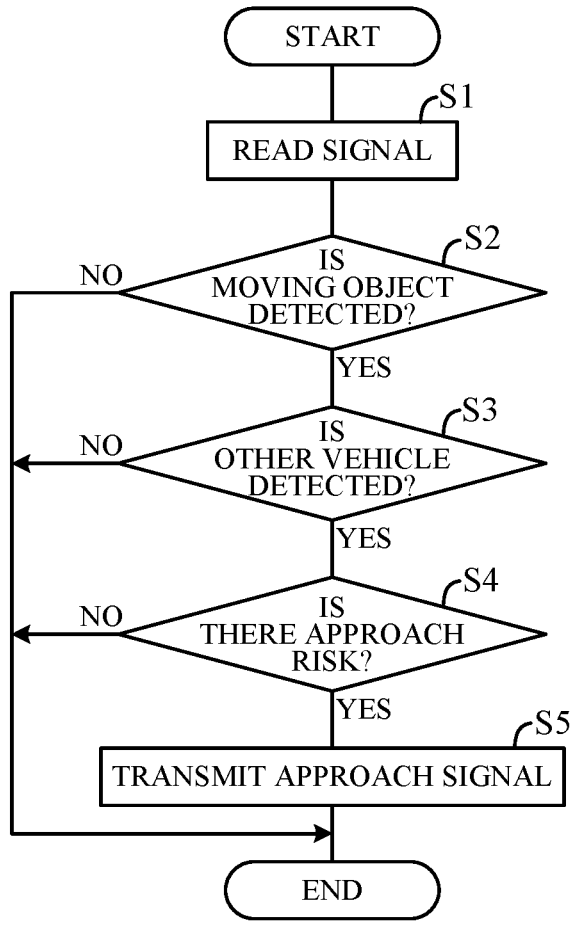
FIG. 4A is a flowchart illustrating an example of processing executed by a controller in the first vehicle as a detection vehicle.
Figure 4B:
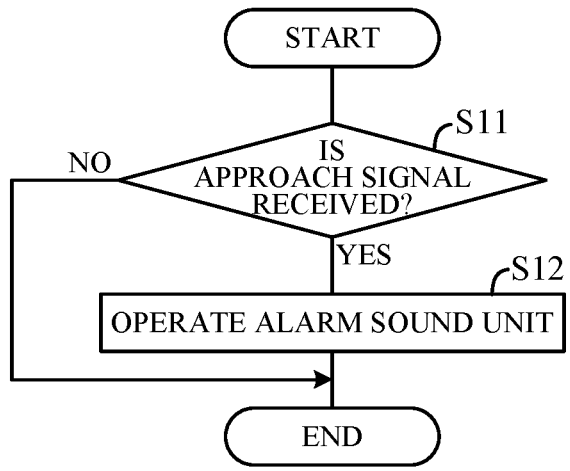
FIG. 4B is a flowchart illustrating an example of processing executed by a controller in the second vehicle as a notification vehicle.

FIG. 4A is a flowchart illustrating an example of processing executed by the controller 10 of the first vehicle 101 as the detection vehicle, that is, processing performed by the moving object recognition unit 171, the approach determination unit 172, and the output unit 173. FIG. 4B is a flowchart illustrating an example of processing executed by the controller 10 of the second vehicle 102 as the notification vehicle, that is, processing executed by the warning control unit 174. The processes in FIGS. 4A and 4B are started by turning on the power switch, for example, and are repeated at a predetermined cycle.

As illustrated in FIG. 4A, first, in S1 (S: processing step), the controller 10 reads a signal from the moving object detector 1a of the subject vehicle (first vehicle 101), and also reads a signal from another vehicle (second vehicle 102) around the subject vehicle via the communication unit 7. Next, in S2, the controller 10 determines whether any moving object (vehicle or person) is detected around the subject vehicle on the basis of a signal from the moving object detector 1a. For example, the controller 10 determines whether the target vehicle 103 is located around the first vehicle 101. If the determination is in the affirmative in S2, the process proceeds to S3, and if the determination is in the negative, the process passes S3 to S5 and is ended.

In S3, the controller 10 grasps the position and moving direction of the other vehicle around the subject vehicle by inter-vehicle communication via the communication unit 7, and determines whether there is a predetermined other vehicle (second vehicle 102) moving to a direction approaching the moving object (target vehicle 103) from a direction different from the traveling direction of the moving object. This is a determination as to whether there is another vehicle that may cause an approach risk. If the determination is in the affirmative in S3, the process proceeds to S4, and if the determination is in the negative, the process passes S4 and S5 and is ended.

In S4, the controller 10 detects whether there is an approach risk between the moving object (target vehicle 103) detected in S2 and the predetermined other vehicle (second vehicle 102) detected in S3. In this case, first, the controller 10 detects whether the moving object (target vehicle 103) detected in S2 is obliged to stop. This determination is made based on, for example, a camera image of the subject vehicle (first vehicle 101). For example, if the traffic light in front of the moving object is red or if there is a sign for temporary stop in front of the moving object, the controller 10 determines that the moving object is obliged to stop.

Next, the controller 10 predicts (determines) whether the moving object (target vehicle 103) may violate the obligation to stop. For example, the controller 10 detects the vehicle speed of the moving object based on a signal from the moving object detector 1a. If the vehicle speed is equal to or greater than a predetermined value at a predetermined point in front of the stop obligation point (stop line), the controller 10 determines that there is a possibility of violating the obligation to stop. That is, if the moving object intends to stop at the stop obligation point, it is considered that the moving object will gradually decelerate before reaching the stop obligation point. Therefore, if the moving object does not decelerate, the controller 10 determines that there is a risk of the moving object violating the obligation to stop.

Further, based on the current position and vehicle speed of the predetermined other vehicle (second vehicle 102) obtained by the inter-vehicle communication, the controller 10 calculates the time (passing time) from when the other vehicle enters the intersection 200 to when the other vehicle passes through the intersection 200, and based on the vehicle speed of the moving object, the controller 10 determines whether the moving object enters the intersection 200 within the passing time. The passing time may be calculated with a point at a predetermined distance short of the intersection 200 as a starting point. When determining that the moving object enters the intersection 200 within the passing time, the controller 10 determines that there is an approach risk. When the determination is in the affirmative in S4, the process proceeds to S5, and when the determination is in the negative, the process is ended.

In S5, the controller 10 transmits an approach signal to the predetermined other vehicle detected in S3, that is, the other vehicle (second vehicle 102) determined to have an approach risk to the moving object, via the inter-vehicle communication, and then the process is ended.

As illustrated in FIG. 4B, in S11, the controller 10 determines whether the predetermined other vehicle (second vehicle 102) receives the approach signal via inter-vehicle communication. When the determination is in the affirmative in S11, the process proceeds to S12, and when the determination is in the negative, the process is ended. In S12, the controller 10 outputs a control signal to the alarm sound unit 8 to operate the alarm sound unit 8. Accordingly, a warning sound is emitted from the predetermined other vehicle to the surroundings to attract attention of the driver of the moving object.

The operation of the present embodiment is summarized as follows. As illustrated in FIG. 1, when the first traffic light 201A at intersection 200 is red, the first vehicle 101 stopped at the foremost part of the intersection 200 recognizes the approach of the target vehicle 103 traveling on the opposite lane (first road RD1) by a signal from the moving object detector 1a (S2). At this time, the first vehicle 101 also recognizes the second vehicle 102 traveling on the second road RD2 and approaching the intersection 200 by a signal from the moving object detector 1a or via inter-vehicle communication (S3).

At this time, when the target vehicle 103 goes straight at the intersection 200 in violation of the obligation to stop, the target vehicle 103 and the second vehicle 102 may suddenly approach each other. When there is such an approach risk, the first vehicle 101 transmits an approach signal to the second vehicle 102 via inter-vehicle communication (S5). Upon receipt of the approach signal, the second vehicle 102 activates the alarm sound unit 8 (S12). This allows the driver of the target vehicle 103 to notice that the front traffic light is red and that the second vehicle 102 is approaching from the second road RD2. As a result, it is possible to avoid sudden approach of the target vehicle 103 to the second vehicle 102.

Figure 5:
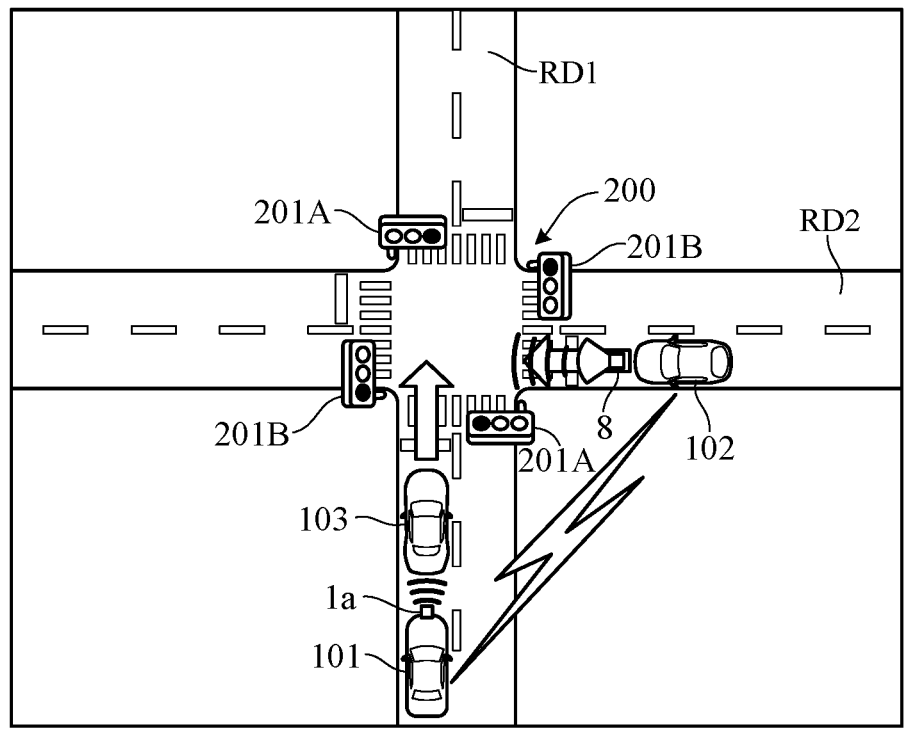
FIG. 5 is a diagram illustrating a first other example of a travel scene assumed by the traffic system according to the embodiment of the present invention.

FIG. 1 illustrates an example in which the moving object recognition unit 171 of the first vehicle 101 as the detection vehicle recognizes the target vehicle 103 approaching the intersection 200 from the front of the first vehicle 101. The moving object recognition unit 171 can also recognize the target vehicle 103 at another position. FIG. 5 is a diagram illustrating an example of the configuration. FIG. 5 illustrates an example in which the first vehicle 101 travels behind the target vehicle 103. Also in this case, the moving object recognition unit 171 recognizes the target vehicle 103 that is a target for determination on the presence or absence of an approach risk, that is, the target vehicle 103 traveling in the same direction as the first vehicle 101. Therefore, when the target vehicle 103 does not stop at a red light and it is determined that there is an approach risk the second vehicle 102, the second vehicle 102 emits a warning sound.

Figure 6:
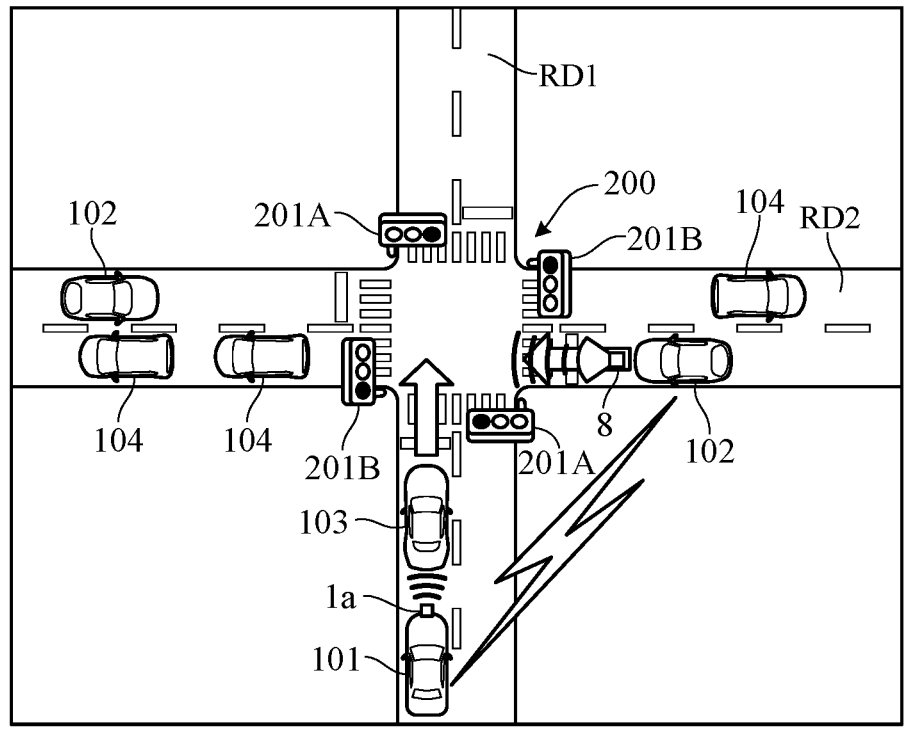
FIG. 6 is a diagram illustrating a second other example of a travel scene assumed by the traffic system according to the embodiment of the present invention.

Although FIG. 1 illustrates an example in which one second vehicle 102 travels toward the intersection 200, a plurality of second vehicles 102 may travel toward the intersection 200. FIG. 6 is a diagram illustrating an example of the configuration. FIG. 6 illustrates two second vehicles 102 that travel on the second road RD2 and are capable of inter-vehicle communication with the first vehicle 101. FIG. 6 also illustrates another vehicle 104 on the second road RD2, which is incapable of or does not perform inter-vehicle communication with the first vehicle 101. When the plurality of second vehicles 102 exist as described above, the output unit 173 of the first vehicle 101 calculates the distances from the second vehicles 102 to the target vehicle 103 based on the positions of the second vehicles 102 obtained via inter-vehicle communication, and outputs an approach signal to the second vehicle 102 closest to the target vehicle 103. Accordingly, a warning sound is issued near the target vehicle 103 so that the driver of the target vehicle 103 easily notices the warning sound. As a result, the target vehicle 103 will stop at the red light.

The second vehicle 102 functions as the notification vehicle that generates a warning sound when no other vehicle is present between the second vehicle 102 and the intersection 200. For example, in the example illustrated in FIG. 7, the first vehicle 101 is stopped, and there are two second vehicles 102 that are traveling on the second road RD2 and are capable of inter-vehicle communication with the first vehicle 101. However, the other vehicle 104 exists between the second vehicle 102 and the intersection 200 in front of either of the second vehicles 102. In this case, the first vehicle 101 does not transmit an approach signal to the second vehicle 102 via inter-vehicle communication, and thus the second vehicle 102 does not emit a warning sound. This makes it possible to prevent the driver of the other vehicle 104 traveling in front of the second vehicle 102 from feeling uncomfortable due to the generation of the warning sound and from causing confusion due to the generation of the warning sound.

Figure 7:
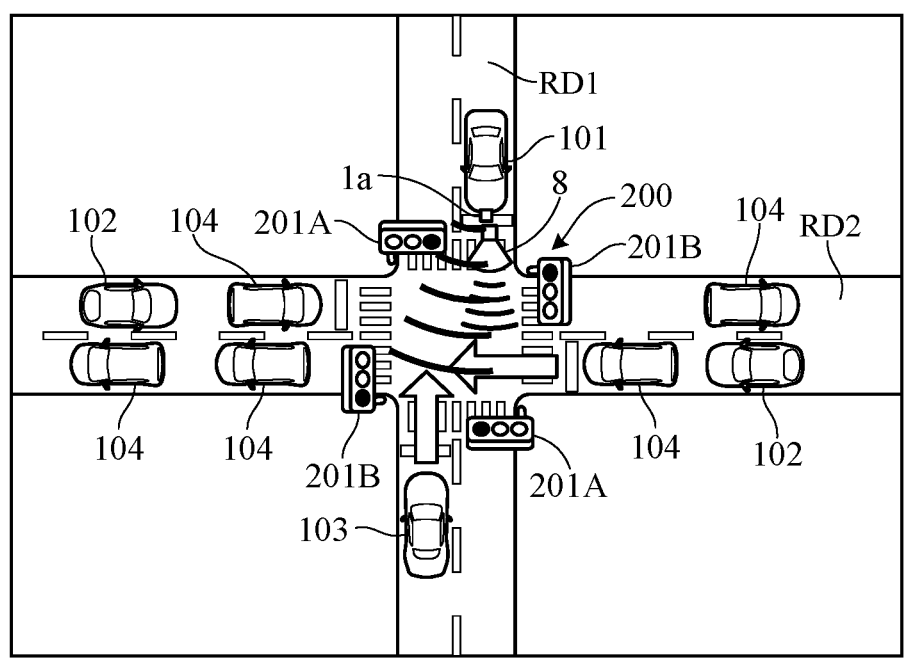
FIG. 7 is a diagram illustrating a third other example of a travel scene assumed by the traffic system according to the embodiment of the present invention.

However, even if the other vehicle 104 is present between the second vehicle 102 and the intersection 200, when the first vehicle 101 itself is stopped at the foremost part of the intersection 200 as shown in FIG. 7, the first vehicle 101 may emit a warning sound from the alarm sound unit 8. That is, the approach determination unit 172 of the first vehicle 101 determines whether the other vehicle 104 exists in front of the second vehicle 102 and short of the intersection 200 based on a signal from the moving object detector 1a, and determines whether the subject vehicle is located at the foremost part of the intersection 200. When the approach determination unit 172 determines that the other vehicle 104 exists and determines that the subject vehicle is located at the foremost part of the intersection 200, the warning control unit 174 of the subject vehicle (first vehicle 101) may activate the alarm sound unit 8 when there is an approach risk of the target vehicle 103. Accordingly, a warning can be issued to the driver of the target vehicle 103.

Figure 8:
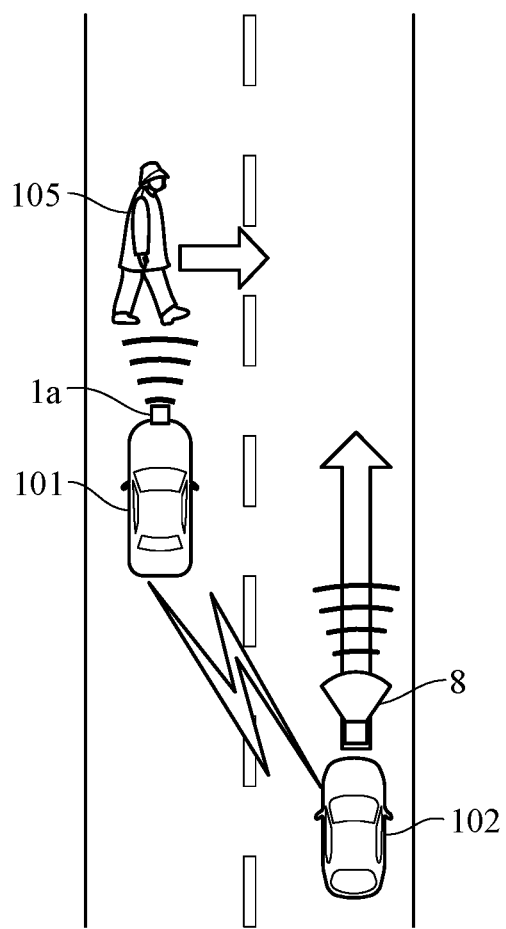
FIG. 8 is a diagram illustrating a fourth other example of a travel scene assumed by the traffic system according to the embodiment of the present invention.

In the above embodiment, the moving object that is the target of an approach risk to the second vehicle 102 is the vehicle (target vehicle 103). However, the moving object may not be a vehicle. FIG. 8 is a diagram illustrating an example of a case where the moving object is a pedestrian 105. FIG. 8 illustrates an example in which the first vehicle 101 is stopped and the pedestrian 105 jumps out in front of the first vehicle 101. At this time, the moving object recognition unit 171 of the first vehicle 101 as the detection vehicle recognizes the pedestrian 105 based on a signal from the moving object detector 1a, and the approach determination unit 172 determines whether there is an approach risk between the pedestrian 105 and the second vehicle 102. When the approach determination unit 172 determines that there is an approach risk, the output unit 173 of the first vehicle 101 transmits an approach signal to the second vehicle 102 via inter-vehicle communication. Accordingly, the warning control unit 174 of the second vehicle 102 can activate the alarm sound unit 8 and issue a warning sound toward the pedestrian 105.

The present embodiment can achieve advantageous effects as follows:

(1) The traffic system according to the present embodiment includes the first vehicle 101 and the second vehicle 102 that can communicate with each other via the communication unit 7 as a communication unit. The second vehicle 102 is located within a predetermined range from the first vehicle 101, that is, is located within a predetermined distance from the intersection 200 when the first vehicle 101 is stopped at the intersection 200 (FIG. 1). The first vehicle 101 includes: the moving object detector 1a that detects an exterior environment situation (external situation) around the first vehicle 101; the moving object recognition unit 171 that recognizes a moving object (target vehicle 103, pedestrian 105) on the basis of the exterior environment situation detected by the moving object detector 1a; the approach determination unit 172 that determines whether there is an approach risk at which a distance from the second vehicle 102 to the moving object recognized by the moving object recognition unit 171 is within a predetermined value; and the output unit 173 that outputs an approach signal when the approach determination unit 172 determines that there is an approach risk (FIG. 3). The second vehicle 102 includes: the alarm sound unit 8 that issues a warning sound to the outside of the second vehicle 102; and the warning control unit 174 that controls the alarm sound unit 8 to issue a warning sound upon receipt of an approach signal output through the output unit 173 of the first vehicle 101 through communication unit 7 (FIG. 3).

According to this configuration, the second vehicle 102 issues a warning sound toward the moving object such as the target vehicle 103 not having the communication function of performing inter-vehicle communication or the pedestrian 105, so that the moving object can be easily notified of the approaching state of the vehicle (second vehicle 102). Therefore, for example, the traffic light state can be notified to the driver of the target vehicle 103 traveling without noticing the red light, whereby a traffic system that promotes safe driving can be provided with a simple configuration.

(2) The approach determination unit 172 determines whether there is an approach risk for a moving object located in an area that is a blind spot from the second vehicle 102, among the moving objects recognized by the moving object recognition unit 171 (FIG. 1). If the second vehicle 102 can recognize a moving object based on its own moving object detector 1a, it is not necessary to acquire the approach information of the moving object from the first vehicle 101 through inter-vehicle communication. Therefore, when a moving object is located in a blind area from the second vehicle 102, the acquisition of information from the first vehicle 101 can be suppressed by acquiring the approach information about the moving object from the first vehicle 101.

(3) The approach determination unit 172 determines whether a moving object is approaching the traveling second vehicle 102. In addition, when determining that a moving object is approaching, the approach determination unit 172 further determines whether the moving object is obliged to stop (for example, whether the traffic light in front of the moving object is red) (FIG. 1). Then, when determining that the moving object is obliged to stop but will not fulfill the stop obligation, the approach determination unit 172 determines that there is an approach risk. Accordingly, it is possible to favorably determine the presence or absence of an approach risk, and prevent the generation of an unnecessary warning sound from the second vehicle 102.

(4) The approach determination unit 172 may determine whether a moving object is approaching the traveling second vehicle 102. In addition, when determining that a moving object is approaching, the approach determination unit 172 may determine whether the second vehicle 102 is obliged to stop. For example, the approach determination unit 172 may determine whether the traffic light on the second road RD2 on which the second vehicle 102 travels is green (FIG. 1). When the second vehicle 102 is not obliged to stop, the approach determination unit 172 may determine that there is an approach risk. This also makes it possible to favorably determine the presence or absence of an approach risk.

(5) When there are a plurality of second vehicles 102 that can communicate with the first vehicle 101, the output unit 173 outputs an approach signal to the second vehicle 102 that is closest to the moving object (FIG. 6). This allows the driver of the target vehicle 103 to easily notice the warning sound.

The above embodiment may be modified into various forms. Hereinafter, some modifications will be described. In the above embodiment, the exterior environment situation around the first vehicle 101 is detected by the moving object detector 1a such as a camera, a radar, or a LiDAR, but the configuration of a detection device is not limited to the above-described one. In the above embodiment, the moving object recognition unit 171 recognizes a moving object by a signal from the moving object detector 1a. However, the recognition unit may recognize another moving object, and the configuration of a recognition unit is not limited to the above-described one.

In the above embodiment, when the output unit 173 of the first vehicle 101 outputs an approach signal, the warning control unit 174 of the second vehicle 102 (the first vehicle 101 in some cases as illustrated in FIG. 7) outputs a control signal to the alarm sound unit 8 to issue a warning sound. However, the configuration of a warning unit is not limited to this one. For example, a light member such as a headlight provided in the second vehicle may be activated to issue a warning. That is, the configuration of a warning unit is not limited to the above-described one, and the configuration of a warning control unit that controls the warning unit is also not limited to the above-described one as long as they can allow a moving object to notice the approach of the second vehicle.

In the above embodiment, whether the target vehicle 103 is obliged to stop is determined based on the color of the traffic light 201, and whether there is an approach risk between the moving object and the second vehicle is determined based on the determination on the stop obligation. However, the presence or absence of an approach risk may be determined by another configuration. For example, whether the target vehicle 103 is obliged to stop may be determined on the basis of whether there is a sign for temporary stop, and the presence or absence of an approach risk may be determined on the basis of the determination on the stop obligation. That is, the configuration of a determination unit is not limited to the above-described one as long as the determination unit determines whether there is an approach risk at which the distance from the second vehicle 102 to the moving object is equal to or shorter than a predetermined value. In the above embodiment, in order for determining the presence or absence of an approach risk, the first reference value or the second reference value is used as the predetermined value of the distance from the second vehicle to the moving object. Alternatively, a third reference value may be used. That is, a warning may be issued to notify that the moving object may violate the obligation to stop although there is no possibility that the moving object collides with the second vehicle.

In the above embodiment, the traffic system is configured such that both the first vehicle 101 and the second vehicle 102 are self-driving vehicles. However, one or both of the first vehicle and the second vehicle may be a manual driving vehicle having or not having a driving assist function. That is, the present invention can be similarly applied to a traffic system based on manual driving vehicles.

The above embodiment can be combined as desired with one or more of the above modifications. The modifications can also be combined with one another.

According to the present invention, it is possible to easily notify a moving object of an approaching state of a vehicle.

Above, while the present invention has been described with reference to the preferred embodiments thereof, it will be understood, by those skilled in the art, that various changes and modifications may be made thereto without departing from the scope of the appended claims.

What is claimed is:

1. A traffic system including a first vehicle and a second vehicle,
   the first vehicle comprising:
   a communication unit;
   a detection device that detects an external situation around the first vehicle; and
   an electronic control unit including a microprocessor and a memory connected to the microprocessor, wherein the microprocessor of the first vehicle is configured to perform:
   recognizing a moving object based on the external situation detected by the detection device;
   determining whether there is an approach risk indicating that a distance from the second vehicle to the moving object becomes equal to or shorter than a predetermined value; and
   outputting an approach signal when it is determined that there is the approach risk,
   the second vehicle comprising:
   a communication unit;
   a warning unit that issues an alarm outside of the second vehicle; and
   an electronic control unit including a microprocessor and a memory connected to the microprocessor, wherein the microprocessor of the second vehicle is configured to perform
   controlling the warning unit so as to issue the alarm when the approach signal output from the first vehicle is received through the communication unit.

2. The traffic system according to claim 1, wherein the microprocessor of the first vehicle is configured to perform the determining including determining whether there is the approach risk for the moving object located in an area to be a blind spot from the second vehicle.

3. The traffic system according to claim 1, wherein the microprocessor of the first vehicle is configured to perform
the determining including further determining whether the moving object approaches the second vehicle during traveling of the second vehicle and whether the moving object approaching the second vehicle is obliged to stop and fulfills an obligation to stop, and determining that there is the approach risk when the moving object does not fulfill the obligation to stop in spite of being obliged to stop.

4. The traffic system according to claim 1, wherein the microprocessor of the first vehicle is configured to perform
the determining including further determining whether the second vehicle approaches the moving object during traveling of the second vehicle and whether the second vehicle approaching the moving object is obliged to stop, and determining that there is the approach risk when the second vehicle is not obliged to stop.

5. The traffic system according to claim 1, including a plurality of the second vehicles capable of communicating with the first vehicle, wherein
the microprocessor of the first vehicle is configured to perform
the outputting including outputting the approach signal to the second vehicle closest to the moving object among the plurality of the second vehicles.

6. The traffic system according to claim 1, wherein the microprocessor of the first vehicle is configured to perform
the recognizing including recognizing the moving object traveling on a first road toward an intersection of the first road and a second road, and
the determining including determining whether there is the approach risk when the second vehicle travels on the second road toward the intersection.

7. The traffic system according to claim 6, wherein the microprocessor of the first vehicle is configured to perform
the determining including determining whether there is the approach risk in a state that the first vehicle stops facing the intersection.

8. The traffic system according to claim 6, wherein the microprocessor of the first vehicle is configured to perform
the determining including determining whether there is the approach risk in a state that the first vehicle travels behind the moving object.

9. A traffic system including a first vehicle and a second vehicle,
the first vehicle comprising:
a communication unit;
a detection device that detects an external situation around the first vehicle; and
an electronic control unit including a microprocessor and a memory connected to the microprocessor, wherein
the microprocessor of the first vehicle is configured to function as:
a recognition unit that recognizes a moving object based on the external situation detected by the detection device;
a determination unit that determines whether there is an approach risk indicating that a distance from the second vehicle to the moving object recognized by the recognition unit becomes equal to or shorter than a predetermined value; and
an output unit that outputs an approach signal when it is determined by the determination unit that there is the approach risk,
the second vehicle comprising:
a communication unit;
a warning unit that issues an alarm outside of the second vehicle; and
an electronic control unit including a microprocessor and a memory connected to the microprocessor, wherein
the microprocessor of the second vehicle is configured to function as
a warning control unit that controls the warning unit so as to issue the alarm when the approach signal output from the output unit is received through the communication unit.

10. The traffic system according to claim 9, wherein the determination unit determines whether there is the approach risk for the moving object recognized by the recognition unit and located in an area to be a blind spot from the second vehicle.

11. The traffic system according to claim 9, wherein the determination unit further determines whether the moving object approaches the second vehicle during traveling of the second vehicle and whether the moving object approaching the second vehicle is obliged to stop and fulfills an obligation to stop, and determines that there is the approach risk when the moving object does not fulfill the obligation to stop in spite of being obliged to stop.

12. The traffic system according to claim 9, wherein the determination unit further determines whether the second vehicle approaches the moving object during traveling of the second vehicle and whether the second vehicle approaching the moving object is obliged to stop, and determines that there is the approach risk when the second vehicle is not obliged to stop.

13. The traffic system according to claim 9, including a plurality of the second vehicles capable of communicating with the first vehicle, wherein
the output unit outputs the approach signal to the second vehicle closest to the moving object among the plurality of the second vehicles.

14. The traffic system according to claim 9, wherein the recognition unit recognizes the moving object traveling on a first road toward an intersection of the first road and a second road, and
the determination unit determines whether there is the approach risk when the second vehicle travels on the second road toward the intersection.

15. The traffic system according to claim 14, wherein the determination unit determines whether there is the approach risk in a state that the first vehicle stops facing the intersection.

16. The traffic system according to claim 14, wherein the determination unit determines whether there is the approach risk in a state that the first vehicle travels behind the moving object.

* * * * *